United States Patent
MacNeille et al.

(10) Patent No.: US 10,152,962 B2
(45) Date of Patent: *Dec. 11, 2018

(54) SYSTEM AND METHOD FOR PERSONALIZED SOUND ISOLATION IN VEHICLE AUDIO ZONES

(71) Applicant: Ford Global Technologies, LLC, Dearborn, MI (US)

(72) Inventors: Perry Robinson MacNeille, Lathrup Village, MI (US); James Andrew Miloser, Saline, MI (US); Jorge Acosta, Ann Arbor, MI (US); Eric Marsman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/713,338

(22) Filed: Sep. 22, 2017

(65) Prior Publication Data

US 2018/0012589 A1 Jan. 11, 2018

Related U.S. Application Data

(63) Continuation of application No. 15/005,351, filed on Jan. 25, 2016, now Pat. No. 9,773,495.

(51) Int. Cl.
  *G10K 11/178* (2006.01)
  *G06F 3/16* (2006.01)
  *H04R 1/10* (2006.01)
(52) U.S. Cl.
  CPC .......... *G10K 11/178* (2013.01); *G06F 3/165* (2013.01); *H04R 1/1083* (2013.01);
  (Continued)

(58) Field of Classification Search
  CPC ..... G10K 11/1786; G10K 2210/12822; G10K 2210/30231; G10K 2210/3046; G06F 3/165
  See application file for complete search history.

(56) References Cited

U.S. PATENT DOCUMENTS 7,106,867 B2  9/2006 Daly
8,112,272 B2  2/2012 Nagahama et al.
(Continued)

FOREIGN PATENT DOCUMENTS

WO  WO 2008101198 A2  8/2008
WO  WO 2016093971 A1  6/2016
(Continued)

OTHER PUBLICATIONS

Active Cabin Noise [online], The Clemson University Vehicular Electronics Laboratory, retrieved on Oct. 14, 2015 from http://www.cvel.clemson.edu/auto/systems/active_cabin_noise_suppression.html.

(Continued)

*Primary Examiner* — Brenda C Bernardi
(74) *Attorney, Agent, or Firm* — James P. Muraff; Neal, Gerber & Eisenberg LLP

(57) ABSTRACT

Embodiments include a vehicle comprising an audio system configured to create a plurality of audio zones within a vehicle cabin, and at least one display communicatively coupled to the audio system. The display is configured to display a separate user interface for each audio zone. Each user interface comprises an engine sound control and a cabin noise control for adjusting an audio output provided to the corresponding audio zone. Embodiments also include a method of providing user-controlled sound isolation in a plurality of audio zones within a vehicle. The method comprises presenting, for each audio zone, a user interface including an engine sound control and a cabin noise control, (Continued)

and generating an audio output for each audio zone based on a first value received from the engine sound control and a second value received from the cabin noise control of the corresponding user interface.

16 Claims, 5 Drawing Sheets

(52) U.S. Cl.
CPC .............. *G10K 2210/12* (2013.01); *G10K 2210/12822* (2013.01); *G10K 2210/3046* (2013.01); *G10K 2210/30231* (2013.01); *H04R 2217/03* (2013.01); *H04R 2410/05* (2013.01); *H04R 2499/13* (2013.01)

(56) References Cited

U.S. PATENT DOCUMENTS

| | | | |
|---|---|---|---|
| 8,126,159 B2 | 2/2012 | Goose et al. | |
| 8,542,844 B2 | 9/2013 | Bowden | |
| 9,020,158 B2 | 4/2015 | Wertz et al. | |
| 2007/0297619 A1 | 12/2007 | Pan | |
| 2010/0124337 A1 | 5/2010 | Wertz et al. | |
| 2011/0286614 A1 | 11/2011 | Hess | |
| 2014/0348354 A1 | 11/2014 | Christoph et al. | |
| 2016/0125869 A1 | 5/2016 | Kulavik et al. | |
| 2016/0142852 A1 | 5/2016 | Christoph | |
| 2016/0144782 A1 | 5/2016 | Jo et al. | |

FOREIGN PATENT DOCUMENTS

| | | |
|---|---|---|
| WO | WO 2016093973 A1 | 6/2016 |
| WO | WO 2016093974 A1 | 6/2016 |

OTHER PUBLICATIONS

Caleb Denison, Harman Wants to Quiet Your Ride Using the Tech Behind Noise-Cancelling Headphones [online], Digital Trends, Oct. 22, 2014, retrieved on Oct. 14, 2015 from http://www.digitaltrends.com/cars/harman-wants-to-quiet-ride-using-tech-behind-noise-cancelling-headphones/.

Search Report dated Mar. 6, 2017 for GB Patent Application No. GB1701137.0 (3 pages).

SYSTEM AND METHOD FOR PERSONALIZED SOUND ISOLATION IN VEHICLE AUDIO ZONES

CROSS-REFERENCE TO RELATED APPLICATIONS

The present application is a continuation application of U.S. patent application Ser. No. 15/005,351, filed on Jan. 25, 2016. The prior application is hereby incorporated by reference in its entirety.

TECHNICAL FIELD

This application generally relates to vehicle audio systems, and more specifically, to providing personalized sound isolation within a vehicle.

BACKGROUND

Driving in automotive vehicles is become an increasingly quieter experience. For example, most vehicles utilize sound damping materials and passenger compartment designs to help isolate vehicle occupants from unwanted engine and road noise. Some automotive vehicles also include active noise cancellation or reduction systems to help provide a quieter and more peaceful driving experience. In addition to engine sounds and road rumble, other unwanted noises in the vehicle cabin can include wind noise, sounds from other vehicle occupants, and noise generated by the vehicle's heating, ventilation, and air conditioning (HVAC) unit. Conversely, a number of performance vehicles augment or increase the engine sounds entering the vehicle cabin, for example, by sending the engine noise through the speakers of the vehicle with a preset gain. Regardless of the type of treatment, such noise cancellation or augmentation effects are typically applied uniformly throughout the vehicle cabin.

A few existing vehicle audio systems generate sound zones around one or more vehicle occupants, where each sound zone can be designed to include only desired audio signals and to exclude any unwanted audio or noise picked up within the vicinity of the occupant. For example, a first sound zone may include a volume around the ears of the vehicle driver, and a second sound zone may include a volume around the ears of one or more vehicle passengers. A user interface or control panel enables the user to define the boundaries of each sound zone, for example, through user-selection of pre-defined geometric shapes that represent the available sound zones, and to turn the sound zones on or off. The control panel also enables the user to select the audio sources to be played within each sound zone and to control a sound volume level for each sound zone. However, existing audio systems are not capable of providing individualized user control over the noise cancellation and augmentation features provided within each sound zone of the vehicle.

Accordingly, there is still a need in the art for vehicle systems and methods that can provide improved sound isolation within each sound zone of a vehicle cabin.

SUMMARY

The invention is intended to solve the above-noted and other problems through systems and methods for providing user-controlled sound isolation within each sound zone of a vehicle cabin, wherein each sound zone is associated with a user interface for selecting noise control values, such as, for example, a road noise value, an engine sound value, and an in-cabin noise value.

For example, one embodiment provides a vehicle comprising an audio system configured to create a plurality of audio zones within a vehicle cabin, and at least one display communicatively coupled to the audio system. The display is configured to display a separate user interface for each audio zone. Each user interface comprises an engine sound control and a cabin noise control for adjusting an audio output provided to the corresponding audio zone.

Another example embodiment provides a user interface for a multi-seat vehicle having a plurality of audio zones. The user interface comprises, for each audio zone, a first input device configured to receive user-entry of a cabin noise gain, and a second input device configured to receive user-entry of an engine sound gain. The cabin noise gain and engine sound gain are provided to an audio system to adjust an audio output provided to the audio zone.

An additional example embodiment includes a method of providing user-controlled sound isolation in a plurality of audio zones within a vehicle. The method comprises presenting, for each audio zone, a user interface including an engine sound control and a cabin noise control, and generating an audio output for each audio zone based on a first value received from the engine sound control and a second value received from the cabin noise control of the corresponding user interface.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
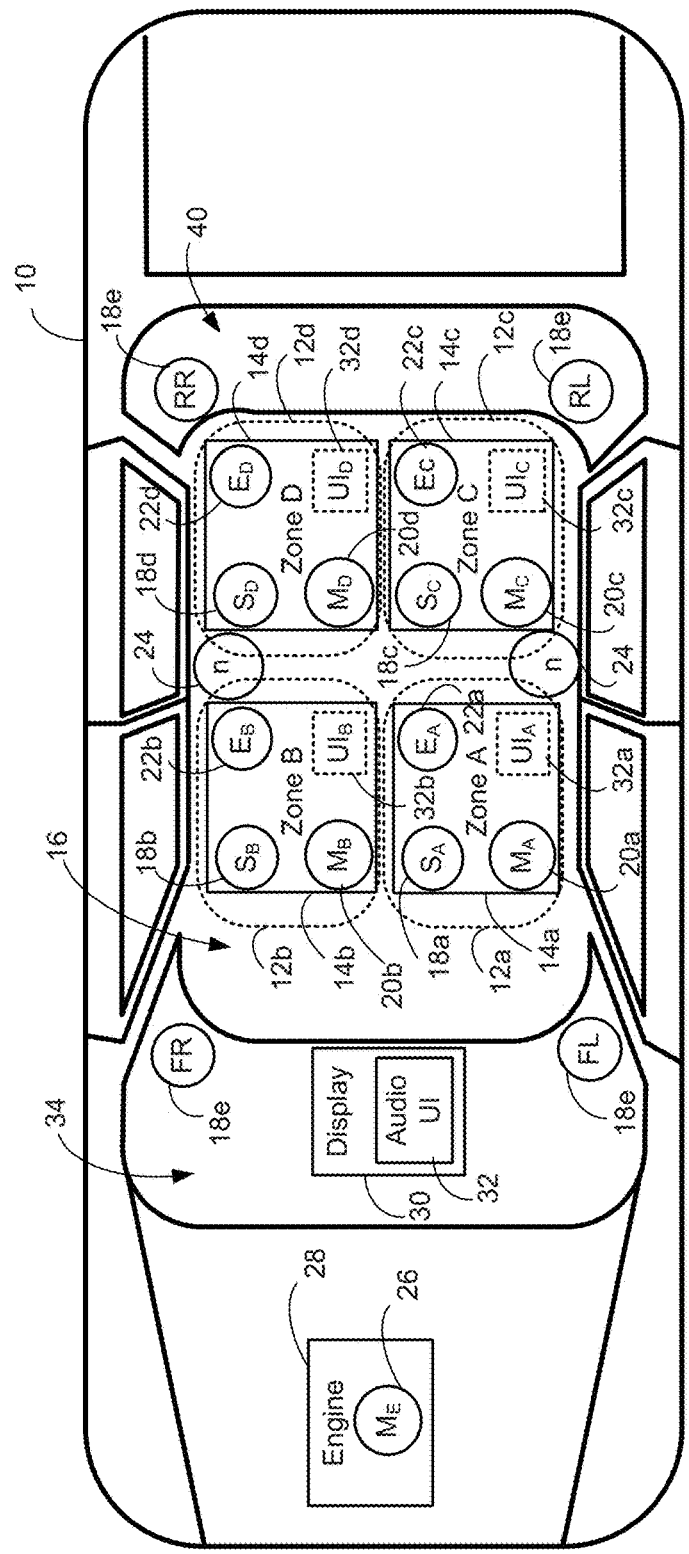
FIG. 1 is an illustration of an exemplary vehicle, in accordance with certain embodiments.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

FIG. 1 illustrates an exemplary vehicle 10 with a plurality of audio zones 12 for providing a personalized audio output to vehicle occupant(s) (not shown) seated in each audio zone 12, in accordance with embodiments. Each of the audio zones 12 can be associated with at least one of a plurality of vehicle seats 14 included in a cabin area 16 of the vehicle 10 and can represent a volume, or three-dimensional space, surrounding the seat(s) 14 associated therewith or, more specifically, the ears of the occupant(s) seated therein. In embodiments, each audio zone 12 can be configured such that the occupant(s) or listener(s) within that zone 12 experiences a user-specified sound isolation effect in addition to any audio signal selected for playback through one or more audio speakers 18 directed towards the audio zone 12. The sound isolation effect includes noise cancellation, reduction, and/or augmentation and, along with the selected audio signal, can form the personalized audio output provided to each audio zone 12 (such as, e.g., audio output signals 104 shown in FIG. 2).

For example, in FIG. 1, a first audio zone 12a (also referred to herein as "Zone A") includes a first volume surrounding a driver seat 14a and is configured to present a personalized audio output to a driver seated therein. Likewise, a second audio zone 12b (also referred to herein as "Zone B") includes a second volume surrounding a front passenger seat 14b and can be configured to present a second audio output to a front passenger seated therein. As a further example, a third audio zone 12c (also referred to herein as "Zone C") includes a third volume surrounding a left rear passenger seat 16c and can be configured to present a third audio output to a left rear passenger seated therein. As also shown, a fourth audio zone 12d (also referred to herein as "Zone D") includes a fourth volume surrounding a right rear passenger seat 16d and can be configured to present a fourth audio output to a right rear passenger seated therein. In some embodiments, each vehicle seat 14 includes a presence detector (not shown) to determine whether an occupant is sitting in the seat 14 before activating the sound isolation features described herein. The vehicle seats 14 can be separate or captain style seats or bench-style seats.

As will be appreciated, the number of audio zones 12 can vary depending on the style or type of vehicle 10 (e.g., sedan, full-sized van, minivan, SUV, truck, coupe, etc.) and can have a number of configurations other than that shown in FIG. 1, including combining one or more of the audio zones 12 to form a larger audio zone. For example, all of the rear audio zones (e.g., zones 12c and 12d) may be combined to form a single rear audio zone, and all of the front audio zones (e.g., zones 12a and 12b) may be combined to form a single front audio zone. As another example, all of the passenger audio zones (e.g., zones 12b, 12c, and 12d) may be combined to form a single passenger audio zone, and the driver audio zone (e.g., zone 12a) may remain independent of the passenger audio zone. In yet another example, if one of the vehicle seats 14 is a bench seat, the corresponding audio zone 12 may be shaped to cover the entire bench seat or specific sections of the bench seat.

Figure 2:
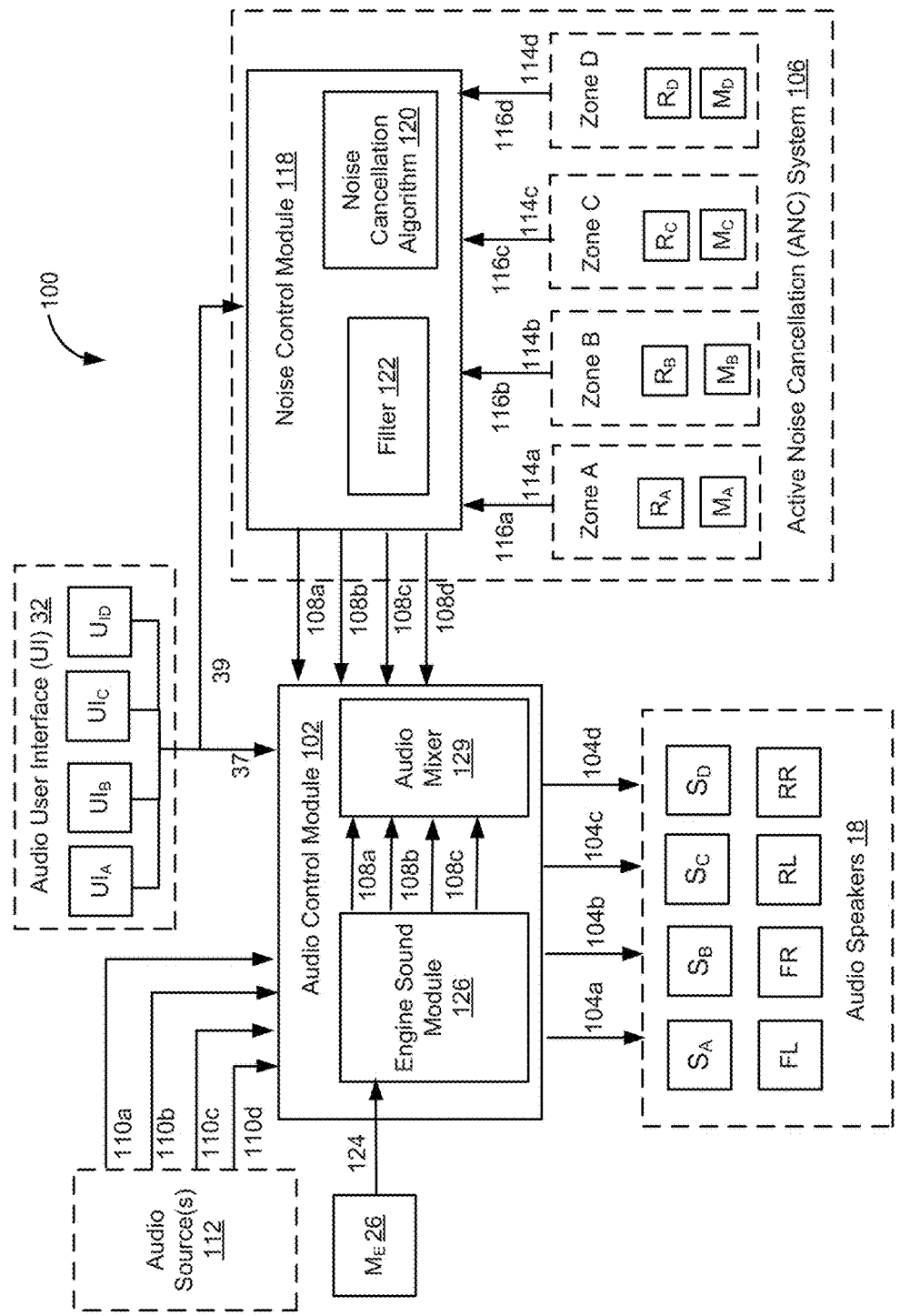
FIG. 2 is a block diagram showing an exemplary audio system included in the vehicle of FIG. 1, in accordance with certain embodiments.

As shown in FIG. 1, the vehicle 10 includes a plurality of the audio speakers 18, a plurality of receiver microphones 20, and a plurality of error microphones 22 configured to present the personalized audio output generated for each audio zone 12 to the corresponding zone 12. Referring additionally to FIG. 2, the audio speakers 18, receiver microphones 20, and error microphones 22 form part of a vehicle audio system 100 included in the vehicle 10 for creating the plurality of audio zones 12 and providing a personalized audio output to each zone 12, in accordance with embodiments. More specifically, the audio system 100 includes an audio control module 102 for generating a user-configured audio output signal 104 for each of the audio zones 12 and for providing each audio output signal 104 to the one or more speakers 18 directed towards the corresponding audio zone 12.

In embodiments, each of the audio zones 12 can be associated with a predetermined set of the speakers 18, the speaker set comprising at least two audio speakers 18 for providing improved directed audio within the audio zone 12. For example, in the illustrated embodiment, a first set of speakers ($S_A$) 18a is configured to provide a first audio output signal 104a to Zone A; a second set of speakers ($S_B$) 18b is configured to provide a second audio output signal 104b to Zone B; a third set of speakers ($S_C$) 18c is configured to provide a third audio output signal 104c to Zone C; and a fourth set of speakers ($S_D$) 18d is configured to provide a fourth audio output signal 104d to Zone D. In embodiments, each input audio signal 104 can be separated into a number of channel components (e.g., front and rear components and/or left and right components) depending on the number and/or placement of the speakers 18 within the set.

The audio system 100 further includes an active noise cancellation (ANC) system 106 for providing the sound isolation effect for each audio zone 12 by, among other things, generating an anti-noise signal 108 for each audio zone 12 based on unwanted sounds or noise picked up by the microphones 20 and 22 in the corresponding audio zone 12. As shown in FIG. 2, the ANC system 106 provides the anti-noise signals 108a, 108b, 108c, and 108d to the audio control module 102. The audio control module 102 combines the anti-noise signals 108 with respective user-selected audio signals 110a, 110b, 110c, 110d to produce a corresponding audio output signal 104 for each of the audio zones 12a, 12b, 12c, and 12d.

In embodiments, the audio control module 102 generates the audio output signal 104 for each audio zone 12 based on the corresponding anti-noise signal 108 and a corresponding input audio signal 110 and selected for that audio zone 12 received from one or more audio sources 112. The audio source(s) 112 can include, for example, a CD/DVD player, an AM/FM/XM radio, an MP3 player, a navigation device, a video camera, a personal media player, a mobile communications device (e.g., cellular telephone), a video game player, or any other audio source included in, or communicatively coupled to, the vehicle audio system 100. The input audio signal 110 may be selected by the occupant seated within the corresponding audio zone 12 or by the vehicle driver, depending on where audio input controls are located in the vehicle 10. In some cases, the same input audio signal 110 can be provided to all audio zones 12, but each audio zone 12 can have a different user-selected sound isolation effect. In other cases, both the input audio signal 110 and the sound isolation effect can be different for each audio zone 12. In still other cases, a select number of the audio zones 12 can receive the same personalized audio output signal 104, while the remaining audio zones 12 can receive different audio output signals 104.

In embodiments, the ANC system 106 can reduce or eliminate unwanted sounds or noise audible within each audio zone 12, and/or in the vehicle cabin 16 as a whole, by generating sound waves that destructively interfere with the unwanted sounds. The destructively interfering sound waves are represented by the anti-noise signal 108 that is included as part of the audio output 102 presented by the speakers 18 to each audio zone 12. The ANC system 106 generates the anti-noise signal 108 for each audio zone 12 based on a cabin noise signal 114 received from the receiver microphones 20 directed towards, or positioned within, the zone 12.

In embodiments, each cabin noise signal 114 can be indicative of any unwanted sound or noise (also referred to herein as "cabin noise") that emanates from one or more noise sources 24 and is audible within the corresponding audio zone 12. The noises sources 24 can be located inside the vehicle cabin 16 and/or outside of the vehicle 10. For example, cabin noise generated by external noise sources 24 can include wind noise, road noise, and other externally-generated sounds. Cabin noise generated by in-cabin noise sources 24 can include HVAC noise, noise generated by other vehicle occupants (e.g., in-person conversations involving other occupants), audio outputs presented to other audio zones 12 within the vehicle 10 (e.g., a hands-free cellular telephone call or video game sounds output through one or more speakers 18), and other internally-generated sounds.

The receiver microphones 20 within each audio zone 12 can be configured to detect or pick up the unwanted cabin noise and output the corresponding cabin noise signal 114 to a noise control module 118 included in the ANC system 106. The noise control module 118 can include a noise cancellation algorithm 120 and an algorithm-driven filter 122 for generating sound waves that are approximately 180 degrees out of phase with each cabin noise signal 114 received from the receiver microphones 20 directed towards the corresponding audio zone 12. These sound waves can form the anti-noise signal 108 provided to the audio control module 102 by the noise cancellation module 118 for each audio zone 12, as shown in FIG. 2. This 180 degree phase shift can cause a desirable destructive interference when the unwanted sound waves detected in each audio zone 12 combine with the anti-noise sound waves of the corresponding anti-noise signal 108, thereby cancelling the unwanted noise that is perceived by the occupant(s) of each zone 12. In some embodiments, the noise control module 118 comprises an anti-noise generator (not shown) or other audio component for generating the anti-noise signals 108.

In embodiments, each audio zone 12 can also be associated with a predetermined set of the receiver microphones 20, the microphone set comprising at least two receiver microphones 20 for providing improved noise detection within the audio zone 12. For example, in the illustrated embodiment, a first set of receiver microphones ($M_A$) 20a are configured to detect unwanted noise audible within Zone A and to generate a first cabin noise signal 114a; a second set of microphones ($M_B$) 20b are configured to detect unwanted noise audible within Zone B and to generate a second cabin noise signal 114b; a third set of microphones ($M_C$) 20c is configured to detect unwanted noise audible within Zone C and to generate a third cabin noise signal 114c; and a fourth set of microphones ($M_D$) 20d is configured to detect unwanted noise audible within Zone D and to generate a fourth cabin noise signal 114d.

Still referring to FIGS. 1 and 2, the ANC system 106 can dynamically adjust or refine the anti-noise signal 108 generated for each audio zone 12 based on a noise cancellation error signal 116 detected by the error microphones 22 directed towards, or positioned within, that audio zone 12. The noise cancellation error signal 116 can reflect any differences between the anti-noise signal 108 and the unwanted cabin noise audible within each audio zone 12, or the cabin noise signal 114 picked up by the receiver microphones 20 therein. The noise cancellation error signals 116 can be input to the noise control module 118 to more accurately produce anti-noise sound waves that destructively interfere with the unwanted sound waves audible in the corresponding audio zone 12. Prior to adjusting the anti-noise signal 108, the error signal 116 for each audio zone 12 can be processed to accommodate for, or remove, sound waves based on the input audio signal 110 presented to that audio zone 12 using the corresponding speakers 18.

According to embodiments, each audio zone 12 can be associated with a predetermined set of the error microphones 22, the set comprising at least two error microphones 22 for providing improved error signal detection within the audio zone 12 for adjusting the noise cancellation effect of the corresponding anti-noise signal 108. For example, in the illustrated embodiment, a first set of error microphones ($E_A$) 22a are configured to detect a first error signal 116a within Zone A; a second set of error microphones ($E_B$) 22b are configured to detect a second error signal 116b within Zone B; a third set of error microphones ($E_C$) 22c is configured to detect a third error signal 116c within Zone C; and a fourth set of error microphones ($E_D$) 22d is configured to detect a fourth error signal 116d within Zone D.

In some embodiments, the cabin noise detected by the receiver microphones 20 includes engine noise audible within the vehicle cabin 16 and detected by the receiver microphones 20. In other embodiments, for example, as shown in FIG. 1, the engine noise or sound can be provided by an engine microphone ($M_E$) 26 positioned in an engine 28 (or engine block) of the vehicle 10 and output as an engine sound signal 124 by the microphone 26 for augmenting or adjusting the engine noise audible within each audio zone 12. The engine microphone 26 may be any type of device suitable for detecting sound within the engine 28. In some cases, the engine microphone 26 is a microphone configured to pick up or capture audible sounds produced by the engine 28. In other cases, the microphone 26 may be a sensor, such as an accelerometer, that is configured to generate the engine sound signal 124 based on a current operating condition of the engine 28 detected by the sensor, where the operating condition can be indicative of the level of engine noise.

In some embodiments, the engine sound signal 124 can be provided to the noise control module 118 to cancel or reduce the engine noise audible within the audio zone 12. In other embodiments, for example, as shown in FIG. 2, the engine microphone 26 can be configured to provide the engine sound signal 124 to an engine sound module 126 included in the audio control module 102. In embodiments, the engine sound module 126 can be configured to augment or increase the engine noise, as needed based on user-selected engine noise settings for each audio zone 12, and produce an augmented or adjusted engine noise signal 128 for each audio zone 12. The audio control module 102 may include an audio mixer 129 for combining the adjusted engine noise signals 128a, 128b, 128c, and 128d with corresponding input audio signals 110a, 110b, 110c, and 110d and corresponding anti-noise signals 108a, 108b, 108c, and 108d in order to produce the audio output signal 104a, 104b, 104c, and 104d for each of the audio zones 12a, 12b, 12c, and 12d, respectively.

Referring back to FIG. 1, the vehicle 10 also includes a vehicle display 30 that can be configured to display one or more audio user interfaces (UI) 32 for controlling various components of the vehicle audio system 100. The vehicle display 30 can be a display screen included in a human machine interface (such as, e.g., human machine interface (HMI) 210 shown in FIG. 5) of the vehicle 10 or other vehicle unit capable of displaying information. For example, as shown in FIG. 1, the vehicle display 30 may be included in a dashboard 34 or instrument, panel (such as, e.g., instrument panel 216 shown in FIG. 5) of the vehicle 10. In other cases, the vehicle display 30 may be a separate media display screen (such as, e.g., display 214 shown in FIG. 5) for displaying vehicle infotainment information, such as, for example, navigation system information, audio system information, etc. In some embodiments, the vehicle display 30 can be an independent display screen, or head unit display, included in the vehicle 10 and dedicated to displaying the audio user interfaces 32 for individual user control.

In some embodiments, the vehicle display 30 can be on a display screen that is associated with the vehicle 10 and included in an external computing device (not shown) that is communicatively coupled, via a wireless network connection, to a cloud server or service center associated with the vehicle, or a manufacturer of the vehicle. The remote computing device can be configured for displaying the user interfaces 32 for enabling user control of the vehicle audio system 100 by a vehicle occupant, operator, or other authorized individual. In some cases, the remote computing device may also be configured for displaying other vehicle infotainment information (such as, e.g., a FORD SYNC application). For example, the vehicle display 30 may be a display screen of a mobile device that includes a mobile application paired to the vehicle 10, or more specifically, to a vehicle computing system therein (such as, e.g., vehicle computing system (VCS) 200 shown in FIG. 5), for displaying vehicle infotainment information and/or the user interfaces 32. In another embodiment, the vehicle display 30 can be a display screen of a computer, laptop, tablet, or other personal computing device that can access a website or cloud-based application for displaying vehicle infotainment information and/or the user interfaces 32.

As shown in FIGS. 1 and 2, each of the audio zones 12 can be associated with a separate user interface 32 for controlling the audio settings for that zone 12. For example, a user interface 32a can be configured to enable user control of the audio settings for Zone A, a user interface 32b can be configured to enable user control of the audio settings for Zone B, a user interface 32c can be configured to enable user control of the audio settings for Zone C, and a user interface 32d can be configured to enable user control of the audio settings for Zone D.

In embodiments, the user interfaces 32 can include controls for selection of an audio zone 12 to configure, selection of the audio source(s) 112 that will be audible in the selected audio zone 12, and selection of a volume level for audio being played within the selected audio zone 12, among other audio settings (e.g., equalizer settings, fade and other speaker settings, etc.) The user interfaces 32 can also include controls for enabling selection of the boundary lines for the audio zones 12, an option to select which speakers 18 are included in each zone 12, for example, by providing an option to combine two or more audio zones 12 to form a larger zone, an option to select which vehicle seats 14 are included in each zone 12, or other options to define the boundaries of each audio zone 12.

In a preferred embodiment, the user interfaces 32 further include controls, or input devices, for enabling user-selection of the sound isolation effect provided to each audio zone 12. In such cases, each user interface 32 can include inputs or options for selecting a level or value for various noise control settings, such as, for example, a cabin noise cancellation or reduction setting, an engine noise augmentation or adjustment setting, an in-cabin noise reduction setting, a road noise reduction setting, and/or an HVAC noise reduction setting. The user-selected value for each noise control setting can determine which unwanted cabin noise(s) remain audible within a given zone 12, if any, and the degree to which the cabin noise(s) are audible.

For example, the user-selected value for the cabin noise setting may represent a gain that is applied to the anti-noise signal 108 to control how much cabin noise, if any, can be heard within the zone 12. Likewise, the user-selected value for the engine sound setting may represent a gain that is applied to the engine sound signal 124 to control how much augmentation, if any, is applied to the engine sound within the zone 12. In some cases, the noise control module 118 can differentiate between different components of the cabin noise input signals 114 based on known sound sources, such as, for example, the input audio signals 110 that are being supplied by the audio sources 112 to each audio zone 12. In such cases, the user-selected value for a given setting may represent a gain that is applied to a known component of the cabin noise input signal 114 (such as, e.g., input audio signals 110), or conversely, a remaining or unknown component of the cabin noise input signal 114 (e.g., road noise, HVAC noise, and/or other occupant(s) noise), as part of the anti-noise generation process performed by the noise control module 118.

Figure 3:
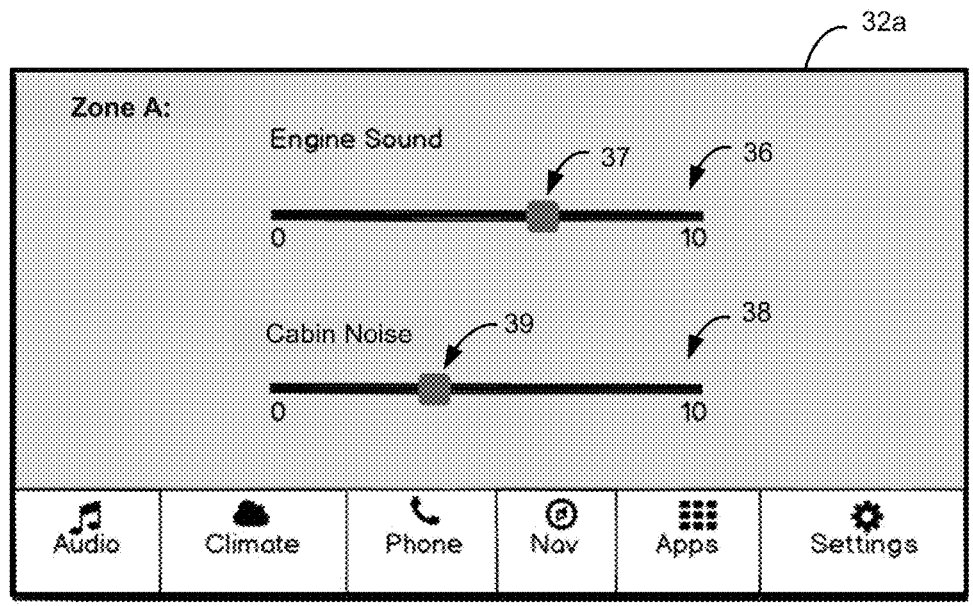
FIG. 3 is an illustration of an exemplary user interface for an audio zone shown in FIG. 1, in accordance with certain embodiments.

To illustrate, FIG. 3 shows an exemplary user interface 32a configured to enable control of the sound isolation effect provided to example audio zone 12a (or Zone A), in accordance with embodiments. As shown, the user interface 32a includes an engine sound control 36 for selecting an engine sound value 37 and a cabin noise control 38 for selecting a cabin noise value 39. In other embodiments, the user interface 32a may include additional controls (not shown) for selecting, for example, an in-cabin noise value, a road noise value, and/or other noise control values, as described herein.

The selected engine sound value 37 can represent a gain to be applied to the engine sound signal 124 included in the audio output signal 104a, or other value for controlling engine noise augmentation within the audio zone 12a. As an example, a zero gain value may be selected if the vehicle occupant (e.g., driver) of the audio zone 12a does not want to hear any engine noise or wants to turn off the engine noise augmentation effect (e.g., a zero or minimum engine noise output). A maximum gain value may be selected if the vehicle occupant wants to augment the engine noise to a highest amplitude or experience a full engine noise augmentation effect (e.g., a maximum engine noise output). Intermediate gain values, such as the engine sound value 37 shown in FIG. 3, may be selected if the vehicle occupant wants to select a specific level of engine noise augmentation (e.g., high, low, medium).

Likewise, the cabin noise value 39 can represent a gain to be applied to the anti-noise signal 108a included in the audio output signal 104a, or other value for controlling noise cancellation or reduction within the audio zone 12a. As an example, a zero gain value may be selected if the vehicle occupant does not want to hear any cabin noise or wants to experience a full noise cancellation effect (e.g., a zero or minimum cabin noise output). A maximum gain value may be selected if the vehicle occupant wants to hear all of the audible cabin noise or turn off the noise cancellation effect (e.g., a maximum cabin noise output). Intermediate gain values, such as the cabin noise value 39 shown in FIG. 3, may be selected if the occupant wants to reduce the amount of cabin noise or experience a noise reduction effect, rather than noise cancellation, the selected value indicating the desired amount of noise reduction (e.g., high, low, medium).

In the illustrated embodiment, the controls 36 and 38 are depicted as slider controls for selecting a value within a range of 0 to 10, wherein a position of the slider controls indicates the selected values 37 and 38. In other embodiments, the controls 36 and 38 can include other types of input devices, such as, for example, buttons or soft keys associated with pre-configured values, arrows or knobs for increasing or decreasing a currently-selected value, or a data entry field for entering a desired value. As will be appreciated, though FIG. 3 only shows the user interface 32a for Zone A, the user interfaces 32b, 32c, and 32d for the other zones 12b, 12c, and 12d, respectively, may be similarly arranged and include similar controls or input devices.

Referring additionally to FIG. 2, the selected cabin noise value 39 can be provided to the noise control module 118, or more specifically, the noise cancellation algorithm 120. The noise control module 118 generates the anti-noise signal 108a based on the cabin noise signal 114a received from the microphones 20a within the audio zone 12a and further based on the cabin noise value 39 received from the user interface 32a. The noise control module 118 uses the cabin noise value 39 to adjust a gain of the anti-noise signal 108a, or a level of noise cancellation/reduction provided by the anti-noise signal 108a. The noise control module 118 then provides the anti-noise signal 108a to the audio control module 102 for inclusion in the audio output signal 104a.

Likewise, the engine noise value 37 can be provided to the audio control module 102, or more specifically, the engine sound module 126. The engine sound module 126 crates the adjusted engine sound signal 128a by using the engine sound value 37 received from the user interface 32 to adjust a gain of the engine sound signal 124, or a level of engine noise augmentation provided to the audio zone 12a. The audio control module 102, or the audio mixer 129, then combines the adjusted engine sound signal 128 with the audio output signal 104a for presentation to the audio zone 12a.

In some embodiments, each of the separate user interfaces 32a, 32b, 32c, and 32d can be individually displayed on the vehicle display 30 in response to user-selection of the corresponding audio zone 12. In some cases, the user may toggle between the separate user interfaces 32 using appropriate controls for selecting an audio zone. In other cases, the user interfaces 32 may be displayed as a group on the vehicle display 30, for example, by arranging the user interfaces 32 side-by-side or in a tiled manner. Occupant control of the user interfaces 32 may depend on a position of the vehicle display 30 within the vehicle cabin 16. For example, if the vehicle display 30 is positioned in a front of the vehicle 10, then the user interfaces 32 may be controlled by the vehicle driver or front passenger, and if the vehicle display 30 is positioned in a rear of the vehicle 10, then the user interfaces 32 may be controlled by one or more rear passengers.

In other embodiments, in addition to the vehicle display 30, the vehicle 10 can include one or more independent display units or head unit displays (such as, e.g., control units 218 shown in FIG. 5) that are physically located at predetermined position(s) within the vehicle cabin 16 for providing additional access to the user interfaces 32. In some cases, an additional display unit can be positioned adjacent to each row of seats to enable the occupants of each row to have access to the user interface 32 associated with that row. For example, though not shown in FIG. 1, the additional control unit may be positioned in the rear of the vehicle cabin 16, for example, between the vehicle seats 14c and 14d, and may be configured to present the user interfaces 32c and 32d for access by the occupants of the rear seats 14c and 14d. In other cases, an additional display unit may be positioned within each of the audio zones 12, or adjacent to the corresponding vehicle seats 14, and may be configured to present the user interface 32 associated with that zone 12, as shown in FIG. 1. In such cases, the occupant(s) of each audio zone 12 can have direct control over the audio settings for that zone 12.

Figure 4:
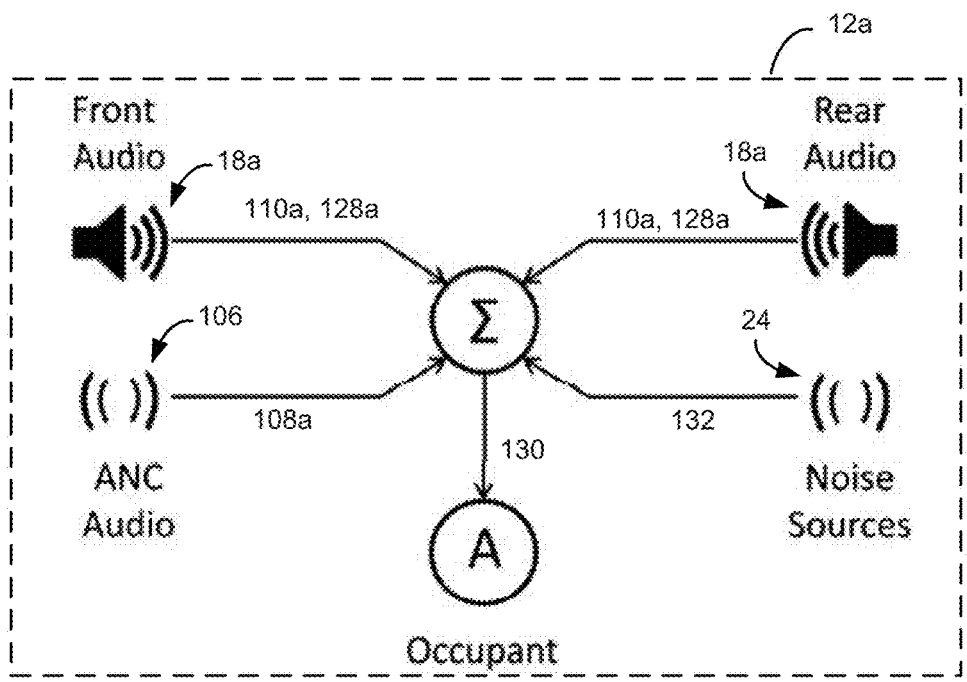
FIG. 4 is an illustration of an exemplary audio zone within the vehicle of FIG. 1, in accordance with certain embodiments.

Referring now to FIG. 4, shown is an exemplary representation of the audio zone 12a created during operation of the audio system 100 of FIG. 2, in accordance with embodiments. The audio zone 12a can be configured to provide a personalized audio output signal 104a to an occupant A seated in the driver seat 14a of the vehicle 10 shown in FIG. 1. In embodiments, an overall sound 130, as perceived by the occupant A, can be produced as a result of a summation operation performed when sound waves emanating from a number of sources combine, either constructively or destructively, within a volume representative of the audio zone 12a. In the illustrated embodiment, the overall sound 130 is produced by combination of the following sounds: the input audio signal 110a and the adjusted engine noise signal 128a presented by the speakers 18a to the occupant A, unwanted cabin noise 132 generated by noise sources 24, and the anti-noise signal 108a generated in response to detection of the noise 132 by the microphones 20a (not shown) directed towards Zone A. The adjusted engine noise signal 128a can represent the engine noise signal 124 adjusted according to a level of augmentation, or gain, determined based on the engine sound value 37 entered into the user interface 32a shown in FIG. 3. For example, if the engine sound value 37 is set to an intermediate value, as shown in FIG. 3, the overall sound 130 will include an audible engine noise component along with the input audio signals 110a.

In embodiments, the anti-noise signal 108a destructively interferes with the unwanted cabin noise 132 according to a level of destruction, or gain, determined by the cabin noise value 39 entered into the user interface 32a. For example, if the cabin noise value 39 is set to zero, the overall sound 130 experienced by the occupant A may primarily represent the input audio signal 110a and the augmented engine sound signal 128. If, on the other hand, the cabin noise value 39 is set to an intermediate value, as shown in FIG. 3, the overall sound 130 experienced by the occupant A may include a reduced cabin noise component along with the signals 110a and 128. As will be appreciated, while FIG. 3 only shows the audio zone 12a, the other audio zones 12b, 12c, and 12d, or any combination thereof, may be created in a similar manner using corresponding components of the audio system 100.

Figure 5:
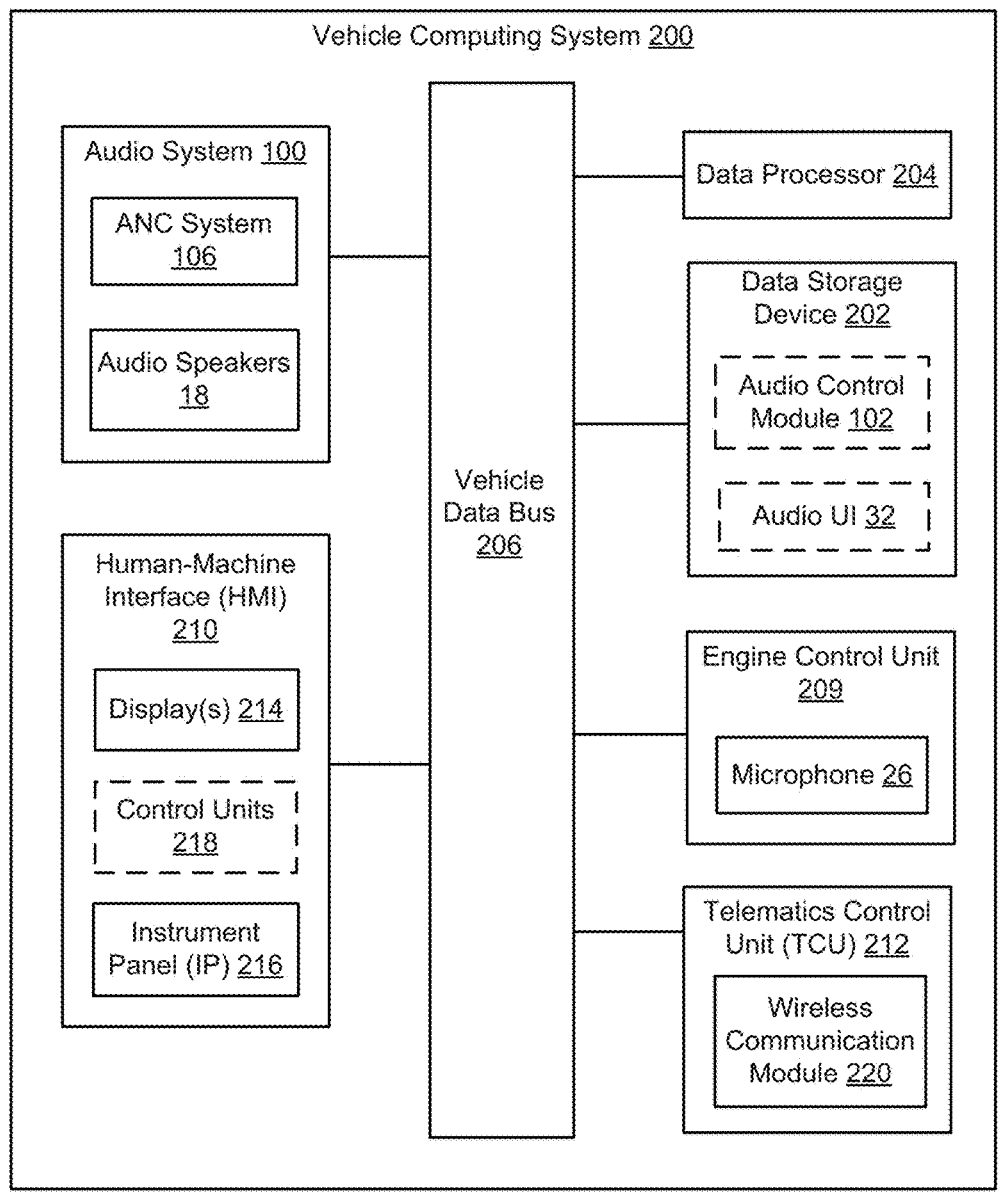
FIG. 5 is a block diagram showing an exemplary vehicle computing system comprising the audio system of FIG. 2, in accordance with certain embodiments.

Referring back to FIG. 2, various components of the audio system 100 can be included in the vehicle cabin 16, the vehicle seats 14, the vehicle computing system of the vehicle 10, or on an external device in communication with a telematics unit of the vehicle 10 (such as, e.g., telematics control unit 212 shown in FIG. 5). In embodiments, the audio system 100 can be communicatively coupled to a vehicle computing system (such as, e.g., vehicle computing system (VCS) 200 shown in FIG. 5) of the vehicle 10 in order to carry out the features of the invention. As shower FIG. 2, the audio control module 102 of the audio system 100 can be communicatively coupled to the user interfaces 32 (or the device(s) displaying the interfaces 32), the audio sources 112, the engine microphone 26, the audio speakers 18, and the ANC system 106. As also shown, the noise control module 118 can be communicatively coupled to the microphones 20 and 22 included in each of the audio zones 12. In embodiments, the components of the audio system 100 can communicate with each other and/or components of the vehicle computing system using wired or wireless connections. If communicating wirelessly, the audio system 100 may further include one or more transmitters (not shown) for wirelessly transmitting output signals to other components.

In embodiments, the plurality of speakers 18 can include any type of audio speaker suitable for audio playback within the vehicle cabin 16 and can include, for example, woofers, sub-woofers, tweeters, super-tweeters, and mid-range speakers. In one embodiment, the speakers 18 can include ultrasonic speakers configured to focus directional sound beams towards each audio zone 12. Though not shown, the speakers 18a, 18b, 18c, and 18d can be located in a vehicle roof area above each audio zone 12 or seat 14, in a vehicle door and/or pillar that is closest to each audio zone 12 or seat 14, in a headrest of each vehicle seat 12, or in other suitable locations of the vehicle cabin 16. The exact location and number of speakers 18 within the vehicle cabin 16 can vary depending on the type of vehicle 10 (e.g., sedan, van, SUV, etc.), the configuration of the audio zones 12, and the type of audio speaker 18. For example, a fewer number of speakers 18 may be needed if there are fewer audio zones 12, such as, a single front audio zone covering the front seats 14a and 14b and a single rear audio zone covering the rear seats 14c and 14d.

In some embodiments, in addition to the speakers $S_A$, $S_B$, $S_C$, and $S_D$, the audio speakers 18 can include a plurality of conventional vehicle speakers 18e positioned around a perimeter of the vehicle cabin 16, for example, at front-left (FL) and front-right (FR) corners of the vehicle dashboard 34 and at rear-left (RL) and rear-right (RR) corners of a rear shelf 40 of the vehicle 10, as shown in FIG. 1. The conventional vehicle speakers 18e can be selectively configured to provide one or more components of the audio output 104 based on the configuration of the audio zones 12. For example, in the illustrated embodiment, the FL speaker 18e may contribute to creating the audio zone 12a, the FR speaker 18e may contribute to creating the audio zone 12b, the RL speaker 18e may contribute to creating the audio zone 12c, and the RR speaker 18e may contribute to creating the audio zone 12d. In other cases, the speakers $S_A$, $S_B$, $S_C$, and $S_D$ may include one or more of, or may be positioned in the illustrated locations of, the FL, FR, RL, RR speakers 18e. In still other cases, the vehicle 10 may include only the FL, FR, RL, RR speakers 18e for presenting the audio output 104. The exact configuration and number of speakers 18 can depend on the type of vehicle 10.

According to embodiments, the microphones 20 and 22 can include any type of microphone or other sensor suitable for detecting audio signals within the vehicle cabin 16. Though not shown, the receiver microphones 20 and the error microphones 22 can be positioned on, or adjacent to, the vehicle seat 14 within the audio zone 12 and directed towards the ears of the vehicle occupant seated in the vehicle seat 14. As an example, the microphones 20 and/or 22 may be positioned within the headrest of each seat 14, in the vehicle roof area above each zone 12 or seat 14, and/or in the vehicle door or pillar that is closest to each zone 12 or seat 14.

In some embodiments, the exact number of microphones 20 and 22 included in each audio zone 12 may be different depending on the configuration of the zone 12 and/or the vehicle seat 14 included therein, and the sound isolation characteristics desired for each. For example, a greater number of microphones 20, 22 may be directed towards the driver seat 14a than towards the other passenger seats 14b, 14c, or 14d in order to provide a more precise sound isolation effect for the driver. As another example, a greater number of microphones 20, 22 may be directed towards the rear passenger seats 14c and 14d than the front seats 14a and 14b in order to provide a quieter ride, or increased sound isolation effect, for the rear passengers as compared to the front passengers.

According to embodiments, each of the audio control module 102, the engine sound module 126, and the noise control module 118 can be implemented in hardware, software, or a combination thereof. In some embodiments, the modules 102, 126, and/or 118 comprise program modules or software instructions stored in a data storage device (such as, e.g., data storage device 202 shown in FIG. 5) and executed by a data processor (such as, e.g., data processor 204 shown in FIG. 5) of the vehicle computing system, as described in more detail below. In other embodiments, the audio system 100 can include an electronic control unit (ECU) or other electronic data processor configured to execute the modules 102, 126, and/or 118, for example, using software instructions stored in a memory of the audio system 100.

Referring now to FIG. 5, shown is example vehicle computing system (VCS) 200 that may be included in the vehicle 10, for example, as part of a vehicle electronics system or an infotainment system of the vehicle 10, in accordance with embodiments. The VCS 200 may be an infotainment system such as the SYNC® system manufactured by FORD MOTOR COMPANY®. Other embodiments of the VCS 200 can include different, fewer, or additional components than those described below and shown in FIG. 5.

As illustrated, the VCS 200 can include data storage device 202, data processor 204 (e.g., an electronic data processor), and a vehicle data bus 206. The VCS 200 can further include various electronic control units (ECUs) responsible for monitoring and controlling the electrical systems or subsystems of the vehicle 10. Each ECU may include, for example, one or more inputs and outputs for gathering, receiving, and/or transmitting data, a memory for storing the data, and a processor for processing the data and/or generating new information based thereon. In the illustrated embodiment, the ECUs of the VCS 200 include the audio system 100, an engine control unit 208, human-machine interface (HMI) 210, and telematics control unit (TCU) 212. Though not shown, the VCS 200 may include other ECUs, such as, for example, a body control module (BCM) for controlling and monitoring various electronic accessories in a body of the vehicle 10 and a transmission control module for controlling and monitoring the transmission of the vehicle 10.

The ECUs of the VCS 200 are interconnected by the vehicle data bus 206 (such as, e.g., a controller area network (CAN) bus or an automotive Ethernet bus), which passes data to and from the various ECUs, as well as other vehicle and/or auxiliary components in communication with the VCS 200. Further, the data processor 204 can communicate with any one of the ECUs and the data storage device 202 via the data bus 206 in order to carry out one or more functions, including the functions associated with the audio system 100.

The engine control unit 208 is an ECU for controlling and monitoring the engine 28 of the vehicle 10. In some embodiments, the engine control unit 208 is combined with the transmission control unit and included in a single ECU, such as, a powertrain control module (PCM). As shown, the engine control unit 208 can include, or be communicatively coupled to, the engine microphone 26 for detecting or capturing a sound of the engine 28 and can provide the engine sound signal 124 to the audio system 100 via the vehicle data bus 206.

As shown in FIG. 5, the audio system 100 can include, or be communicatively coupled to, the plurality of speakers 18 and the ANC system 106 shown in FIG. 2. Though not shown, the audio system 100 can include an AM/FM radio receiver or tuner, an amplifier for driving an audio signal to the speakers 18 or other audio output devices, and one or more media devices (e.g., tape player, CD player, DVD player, satellite radio, auxiliary devices, etc.). In some embodiments, the audio system 100 forms part of a pre-installed infotainment system or other original equipment manufacturer (OEM) system of the vehicle 10. In other embodiments, the audio system 100 comprises a head unit that is installed in the vehicle 10 after-market, for example, by coupling the head unit to the speakers 18 and other OEM components of the vehicle computing system 200.

The human-machine interface (HMI) 210 (also referred to as a "user interface") can be an ECU for enabling user interaction with the vehicle 10 and for presenting vehicle information to the vehicle operator or driver. According to embodiments, one or more components of the HMI 210 can be configured to present the separate user interfaces 32a, 32b, 32c, and 32d for controlling the audio settings for each audio zone 12, for example, as shown in FIG. 3. As shown, the HMI 210 includes at least one media display 214, an instrument panel (IP) 216, and in some cases, one or more audio zone control units 218. Though not shown, the HMI 210, and/or any of the devices included therein, can include one or more input devices and/or output devices for inputting, entering, receiving, capturing, displaying, or outputting data associated with the vehicle computing system 200, the audio system 100, and/or the techniques disclosed herein.

The HMI 210 can be configured to interact with the other ECUs of the VCS 200 and/or the data processor 204 via the data bus 206 in order to provide information or inputs received via the HMI 210 to an appropriate component of the VCS 200 and to present, to the vehicle operator or occupant, information or outputs received from the various components of the VCS 200. For example, when the HMI 210 receives inputs intended for controlling one or more aspects of the audio system 100 (e.g., via the user interfaces 32), the HMI 210 can send the inputs to the audio system MO via the vehicle data bus 206.

As shown, the HMI 210 includes the instrument panel 216 (also referred to as a "dashboard" or "cluster"), which comprises a control panel positioned in front of the driver's seat for housing instrumentation and controls for operation of the vehicle 10. The instrument panel 216 can include a steering wheel and various gauges (e.g., speedometer, odometer, fuel gauge, etc.), as well as various vehicle indicators, such as, for example, a selected position of a gear selector, seat belt warnings or notifications, low fuel, low tire pressure, etc. In some cases, the instrument panel 216 includes a display screen for electronically or digitally displaying the various gauges, or values related thereto, the various vehicle indicators, and other vehicle information. In some embodiments, one or more of the audio user interfaces 32 are displayed on the instrument panel 216.

The HMI 210 also includes at least one media display screen 214 separate from the instrument panel 216 for displaying additional vehicle information, such as, for example, navigation system information, audio system information, video captured by an external vehicle camera (not shown), heating and air/conditioning information, etc. In a preferred embodiment, the audio user interface 32 is presented on the media display screen 214, for example, as shown in FIG. 3. In such cases, the media display screen 14 may be configured to display all of the audio user interfaces 32, either individually or as a group, and user inputs can be received via touch inputs or user-selection of keys, buttons, or other input devices associated with the media display 214. For example, the HMI 210 can be configured to enable the user to toggle through the different audio user interfaces 32 and/or audio zones 12 on the display screen 214 using the input devices of the HMI 210. In such cases, the media display screen 214 displays each user interlace 32 one at a time. In another example, the HMI 210 can be configured to display all of the user interfaces 32 at once but with separate input controls 36, 38 for each user interface 32. In such cases, the group of audio user interfaces 32 can be displayed side-by-side, or as tiles in a grid, on the media display screen 214.

In other embodiments, instead of, or in addition to, presenting the user interfaces 32 on the media display 214 or the instrument panel 216, the HMI 210 includes audio zone control units 118 positioned within, or adjacent to, each audio zone 12. In such cases, the vehicle occupant seated in each audio zone 12 can use the dedicated control unit 218 to personalize the audio output presented to his/her audio zone 12. The zone control units 218 can be any type of user interface console and can include a touch screen, a standard display screen, and/or physical input devices, such as knobs, buttons, keys, sliders, dials, switches, keyboards, keypads, pointing devices, etc. In some embodiments, a first control unit 218 may be provided in, or adjacent to, the Zone A and can be configured to display the user interface 32a shown in FIG. 3; a second control unit 218 may be provided in, or adjacent to, the Zone B and configured to display the user interface 32b; and so forth. In other embodiments, the control units 218 can be implemented with dedicated hardware or control panels that are communicatively coupled to, or included in, the HMI 210 and include the user interface controls 36 and 38 for controlling the sound isolation effect provided to each audio zone 12.

The TCU 212 can be an ECU for enabling the vehicle 10 to connect to one or more wireless networks, such as, for example, WiFi, WiMax, cellular (e.g., GSM, GPRS, LTE, 3G, 4G, CDMA, etc.), Bluetooth, near-field communication (NFC), radio-frequency identification (RFID), satellite, dedicate short-range communication (DSRC), Global Positioning System (GPS), and infrared networks. In embodiments, the TCU 212 includes a wireless communication module 220 comprising one or more antennas, radios, modems, receivers, and/or transmitters (not shown) for connecting to, or interfacing with, the various wireless networks.

In some cases, the TCU 212 can receive external data via the wireless communication module 220 from one or more external devices (not shown) associated with the vehicle 10, such as, for example, a key fob (not shown), a user device paired to the vehicle, and/or a remote server communicatively coupled to the TCU 212. In such cases, the TCU 212 provides the received external data to an appropriate ECU of the VCS 200. In some cases, the TCU 212 can also receive internal data from one or more ECUs and/or the data processor 204 with instructions to transmit the internal data to an external device associated with the vehicle 10.

For example, the TCU 212 can enable the VCS 200, or the vehicle 10, to pair with a user device (e.g., mobile phone, tablet, personal computer, etc.) of the vehicle operator, using Bluetooth, WiFi, cellular, or other wireless communication network and/or via a remote server associated with a manufacturer of the vehicle 10, the VCS 200, and/or an infotainment system of the vehicle 10, such as the FORD SYNC® system. The user device may be configured to display the audio user interfaces 32 to enable user-control of the sound isolation effect provided to each audio zone 12 within the vehicle 10, and other audio settings. For example, the user device may display the audio user interface 32a for Zone A shown in FIG. 3. The VCS 200 may send data pertaining to the audio user interfaces 32 to the vehicle operator or other user through the user device and/or the mobile application, in addition, the VCS 200 may receive inputs or values entered via the user interfaces 32 from the user device. In some cases, the user device may display, and provide access to, the user interface 32 via a mobile application running on the user device. In other cases, the user device may display, and provide access to, the user interface 32 via a website hosted by the remote server.

The data processor 204 can comprise one or more of a microprocessor, a microcontroller, a programmable logic array, an application-specific integrated circuit, a logic device, or other electronic device for processing, inputting, outputting, manipulating, storing, or retrieving data. In embodiments, the VCS 200 can comprise a general purpose computer that is programmed with various programming instructions or modules stored in the data storage device 202 e.g., electronic memory), or elsewhere.

The data storage device 202 can comprise one or more of electronic memory, nonvolatile random access memory (e.g., RAM), flip-flops, a computer-writable or computer-readable storage medium, a magnetic or optical data storage device, a magnetic or optical disc drive, a hard disk drive, or other electronic device for storing, retrieving, reading, or writing data. The data storage device 202 stores one or more software program modules or software instructions, including the audio control module 102, the noise control module 118, and/or the engine sound module 126 for execution by the data processor 204. As shown in FIG. 5, in some cases, the data storage device 202 also stores the audio user interfaces 32, or graphics and other data used to generate the user interfaces 32, and provides the same to the display 214 and/or the control units 218 for display thereon during operation of the audio system 100.

Figure 6:
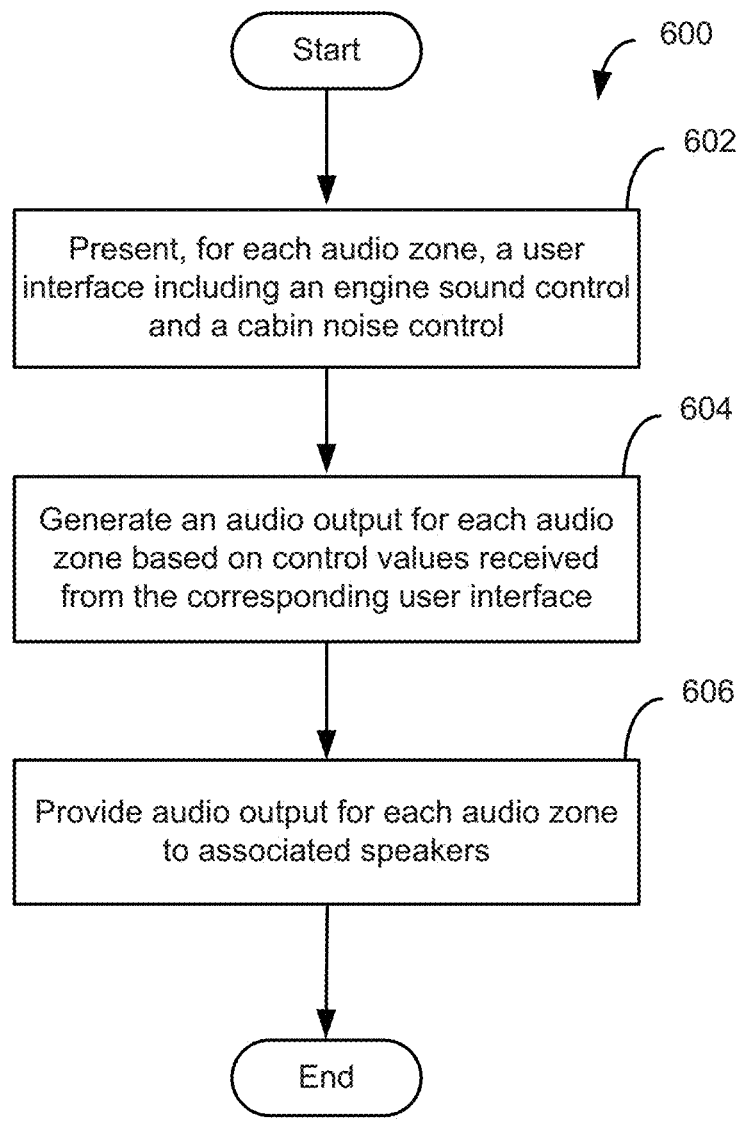
FIG. 6 is a flow diagram of an example method of providing user-controlled sound isolation in each of a plurality of audio zones within a vehicle, in accordance with certain embodiments.

FIG. 6 illustrates an example method 600 for providing a user-controlled sound isolation effect to each of a plurality of audio zones in a vehicle (such as, e.g., the audio zones 12 of the vehicle 10 shown in FIG. 1), in accordance with embodiments. The method 600 can be carried out by one or more processors (or controllers) included in, for example, a vehicle audio system (such as, e.g., the vehicle audio system 100 shown in FIG. 2) and/or a vehicle computing system (such as, e.g., the vehicle computing system (VCS) 200 shown in FIG. 5). In one embodiment, the method 600 is implemented, at least in part, by the data processor 204 of the VCS 200 executing software stored in the data storage device 202, such as, e.g., the audio control module 102 and/or the noise control module 118, and interacting with one or more components of the VCS 200 and/or the vehicle audio system 100 included therein.

The method 600 can begin at step 602, where the processor and/or the audio system presents, for each audio zone, a separate user interface (such as, e.g., audio user interfaces 32 shown in FIG. 2) including a plurality of source-specific noise controls, such as, for example, an engine sound control (such as, e.g., control 36 shown in FIG. 3) and a cabin noise control (such as, e.g., control 38 shown in FIG. 3). For example, each user interface may be displayed on a vehicle display (such as, e.g., the media display screen 214 and/or the control units 218 shown in FIG. 5) and may be configured to receive user inputs via the engine sound control, the cabin noise control, and any other source-specific noise controls (e.g., a road noise control, an occupant noise control etc.). In a preferred embodiment, the engine sound control, the cabin noise control, and any other noise controls are presented on the user interface as slider controls configured to enable a user to slidably select a value within a specified range, for example, as shown in FIG. 3.

At step 604, the processor and/or the audio system generates an output (such as, e.g., audio output signals 104 shown in FIG. 2) for each audio zone based on a first value (such as, e.g., the value 37 shown in FIG. 2) received from the engine sound control and a second value (such as, e.g., the value 39 shown in FIG. 2) received from the cabin noise control of the corresponding user interface, as well as any other noise control values received from the user interface. In embodiments, the first value is an engine sound gain, or a gain of an engine noise component of the audio output presented by the vehicle audio system to the corresponding audio zone. As such, the first value can determine an engine noise augmentation level for the audio zone. Also in embodiments, the second value is a cabin noise gain, or a gain of an anti-noise component of the audio output. As such, the second value can determine a noise cancellation or reduction level for the audio zone. Through user-selection of the first value, the second value, and any other noise control values, the user can personalize the sound isolation effect provided to each audio zone, for example, by turning cabin noise cancellation on/off or selecting a specific level of noise reduction therebetween, and/or by turning engine sound augmentation on/off or selecting a specific level of augmentation therebetween.

According to embodiments, generating the audio output for each audio zone includes combining an anti-noise signal (such as, e.g., the anti-noise signals 108 shown in FIG. 2), an adjusted engine sound signal (such as, e.g., the adjusted engine sound signals 128 shown in FIG. 2), and a user-selected audio signal (such as, e.g., the audio input signals 110 shown in FIG. 2). The adjusted engine sound signal can be generated by the audio system and/or processor based on the first value and an engine noise detected by a microphone adjacent to a vehicle engine (such as, the engine microphone 26 in the engine 28, as shown in FIG. 1). The anti-noise signal can be generated by the audio system and/or processor based on the second value and a cabin noise signal (such as, e.g., signals 114 shown in FIG. 2) detected by a plurality of microphones associated with the corresponding audio zone (such as, e.g., the receiver microphones 20 shown in FIG. 2). In some cases, the anti-noise signal for each audio zone is generated based further on a noise cancellation error signal (such as, e.g., the errors signal 116 shown in FIG. 2) detected by a plurality of error microphones associated with the audio zone (such as, e.g., the error microphones 22 shown in FIG. 2).

In some embodiments, the method 600 further includes step 606, wherein the processor and/or the audio system provides the audio output generated at step 604 for each audio zone to a plurality of speakers (such as, e.g., the speakers 18 shown in FIG. 1) associated with the audio zone. In embodiments, each audio zone can be associated with two or more speakers that are directed towards the audio zone and configured to output only the audio signals selected for that audio zone. The method 600 may end after step 606.

In certain embodiments, the process descriptions or blocks in the figures, such as FIG. 6, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A vehicle, comprising:
a communication interface to connect to a mobile device; and
an audio system configured to:
create a plurality of audio zones within a vehicle cabin; and
display, via the mobile device communicatively coupled to the communication interface, a user interface comprising a vehicle sound control and a cabin noise control for one of the plurality of audio zones, wherein the vehicle sound control and cabin noise control are to adjust audio outputs provided to a corresponding one of the plurality of audio zones.

2. The vehicle of claim 1, wherein the audio system is configured to display the user interface for the one of the plurality of audio zones based on the one of the plurality of audio zones in which the mobile device is located.

3. The vehicle of claim 1, wherein the audio system includes an audio control module configured to generate the audio output for the one of the plurality of audio zones based on a first value received from the vehicle sound control and a second value received from the cabin noise control displayed on the mobile device.

4. The vehicle of claim 3, wherein the audio system includes a plurality of speakers configured to present, to each of the plurality of audio zones, the audio output generated for the corresponding one of the plurality of audio zones.

5. The vehicle of claim 3, wherein the audio control module includes a noise cancellation module, and the audio output for the one of the plurality of audio zones includes an anti-noise output signal generated by the noise cancellation module.

6. The vehicle of claim 5, wherein the audio system includes a plurality of receiver microphones configured to detect, for each of the plurality of audio zones, a cabin noise within the corresponding audio zone, and wherein the second value is a cabin noise gain for the one of the plurality of audio zones, and wherein for the one of the plurality of audio zones, the noise cancellation module is configured to generate the corresponding anti-noise output signal based on the cabin noise and the cabin noise gain.

7. The vehicle of claim 6, wherein the audio system includes a plurality of error microphones configured to detect, for each of the plurality of audio zones, a noise cancellation error signal for the corresponding audio zone, and wherein for the one of the plurality of audio zones, the noise cancellation module is configured to generate the corresponding anti-noise output signal based further on the noise cancellation error signal.

8. The vehicle of claim 1, wherein an engine sound control and a road noise control of the user interface each include a slider control for enabling user selection of a corresponding value.

9. A method of providing user-controlled sound isolation in a plurality of audio zones within a vehicle, the method comprising:
connecting, via a communication interface, to a mobile device;
creating, via an audio system, a plurality of audio zones within a vehicle cabin; and
displaying, via the mobile device, a user interface comprising a vehicle sound control and a cabin noise control for one of the plurality of audio zones, wherein the vehicle sound control and cabin noise control are to adjust audio outputs provided to a corresponding one of the plurality of audio zones.

10. The method of claim 9, wherein displaying the user interface for the one of the plurality of audio zones includes displaying the user interface for the one of the plurality of audio zones based on the one of the plurality of audio zones in which the mobile device is located.

11. The vehicle of claim 10, further comprising generating the audio output for the one of the plurality of audio zones based on a first value received from the vehicle sound control and a second value received from the cabin noise control displayed on the mobile device.

12. The method of claim 11, further comprising presenting, via a plurality of speakers, the audio output generated for the corresponding one of the plurality of audio zones.

13. The method of claim 11, wherein the audio output for the one of the plurality of audio zones includes an anti-noise output signal generated by a noise cancellation module.

14. The method of claim 13, further comprising:
detecting, via a receiver microphone positioned in the one of the plurality of audio zones, a cabin noise within the corresponding audio zone, the second value being a cabin noise gain for the one of the plurality of audio zones; and
generating the corresponding anti-noise output signal based on the cabin noise and the cabin noise gain for the one of the plurality of audio zones.

15. The method of claim 14, further comprising:
- detecting, via an error microphone position in the one of the plurality of audio zones, a noise cancellation error signal; and
- generating the corresponding anti-noise output signal based further on the noise cancellation error signal.

16. The method of claim 9, wherein an engine sound control and a road noise control of the user interface are displayed using a slider control for enabling user selection of a corresponding value.

* * * * *